United States Patent
Bao et al.

(10) Patent No.: US 11,354,921 B2
(45) Date of Patent: Jun. 7, 2022

(54) GENERATION OF DIGITAL WELL SCHEMATICS

(71) Applicant: Landmark Graphics Corporation, Houston, TX (US)

(72) Inventors: Anqi Bao, College Station, TX (US); Vanessa Ndonhong Kemajou, Spring, TX (US); Olivier Germain, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 271 days.

(21) Appl. No.: 16/619,108

(22) PCT Filed: Feb. 5, 2019

(86) PCT No.: PCT/US2019/016650
§ 371 (c)(1),
(2) Date: Dec. 4, 2019

(87) PCT Pub. No.: WO2020/162885
PCT Pub. Date: Aug. 13, 2020

(65) Prior Publication Data
US 2021/0357636 A1  Nov. 18, 2021

(51) Int. Cl.
*G06V 30/00* (2022.01)
*G06V 30/422* (2022.01)
(Continued)

(52) U.S. Cl.
CPC .......... *G06V 30/422* (2022.01); *E21B 44/00* (2013.01); *G06K 9/6227* (2013.01); *G06T 11/60* (2013.01);
(Continued)

(58) Field of Classification Search
CPC ...... G06K 9/202; G06K 9/222; G06K 9/2011; G06K 9/72; G06K 9/4609; G06K 9/48;
(Continued)

(56) References Cited

U.S. PATENT DOCUMENTS 10,626,683 B2 * 4/2020 Hebebrand ............. E21B 19/00
10,699,218 B2 * 6/2020 Anderson .............. G06N 20/10
(Continued)

FOREIGN PATENT DOCUMENTS

CA          3003705         6/2017

OTHER PUBLICATIONS

International Application No. PCT/US2019/016650, "International Search Report and Written Opinion", dated Nov. 5, 2019, 12 pages.

*Primary Examiner* — Amir Alavi
(74) *Attorney, Agent, or Firm* — Kilpatrick Townsend & Stockton LLP

(57) ABSTRACT

Certain aspects and features of the present disclosure relate to analysis of physical media copies of wellbore schematics and the generation of corresponding digital wellbore schematics. Wellbore data may be analyzed by a wellbore schematic analysis tool to produce a structured data file containing information harvesting from a physical media copy of a wellbore schematic. This information may be compared to data from other wellbores and or may be used to generate a new digital wellbore schematic.

20 Claims, 11 Drawing Sheets

(51) Int. Cl.
*E21B 44/00* (2006.01)
*G06K 9/62* (2022.01)
*G06T 11/60* (2006.01)
*G06V 30/414* (2022.01)
*G06V 30/10* (2022.01)

(52) U.S. Cl.
CPC ........ *G06V 30/414* (2022.01); *E21B 2200/20* (2020.05); *G06V 30/10* (2022.01)

(58) Field of Classification Search
CPC ...... G06K 9/4638; G06K 9/4604; G06K 9/80; G06K 9/00718; G06K 9/00797; G06K 9/00476; G06K 9/00463; G06T 7/0083; G06T 7/0085; G06T 2207/10016; G06T 2207/30164; H04N 1/40062; G06F 17/3024; G06F 17/30257; G06F 17/15; G06F 17/30985; G06F 17/2235; G06F 17/30247; G11B 27/28

See application file for complete search history.

(56) References Cited

U.S. PATENT DOCUMENTS

| | | |
|---|---|---|
| 2007/0180421 A1 | 8/2007 | Boose |
| 2015/0193125 A1 | 7/2015 | Whalley |
| 2016/0053604 A1 | 2/2016 | Abbassian et al. |
| 2016/0110369 A1 | 4/2016 | Cervelli et al. |
| 2018/0293438 A1* | 10/2018 | Ortiz ................ G06K 9/00463 |
| 2019/0147125 A1* | 5/2019 | Yu .......................... G06N 3/08 |
| | | 703/10 |
| 2019/0302310 A1* | 10/2019 | Fox ...................... G01V 11/002 |
| 2019/0383965 A1* | 12/2019 | Salman ................ G01V 99/005 |
| 2021/0133367 A1* | 5/2021 | Liu ........................ E21B 17/08 |

* cited by examiner

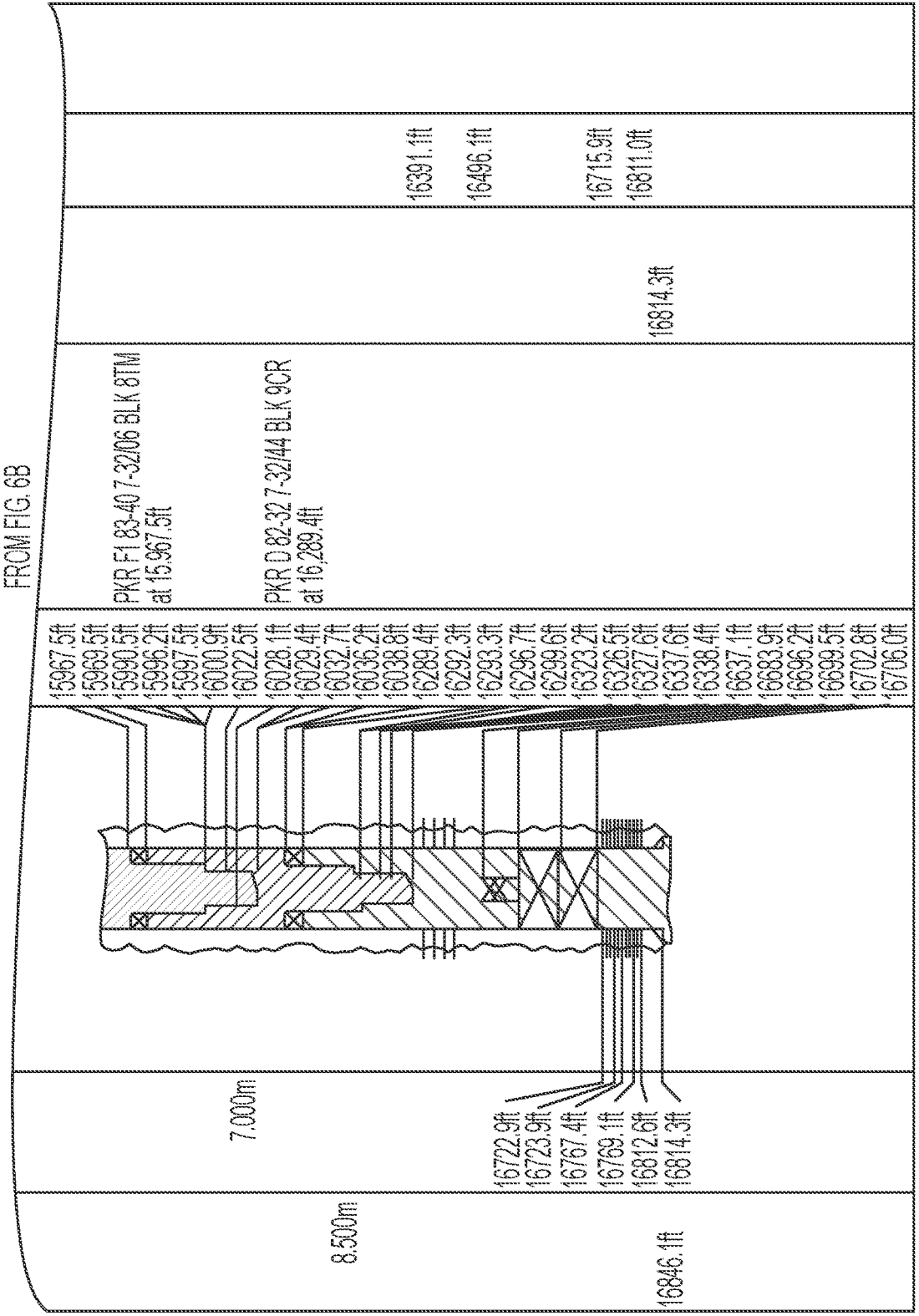

GENERATION OF DIGITAL WELL SCHEMATICS

TECHNICAL FIELD

The present disclosure relates generally to devices for use with well systems. More specifically, but not by way of limitation, this disclosure relates to real-time generation of digital wellbore schematics using machine-learning techniques applied to physical wellbore schematic documents.

BACKGROUND

A well includes a wellbore drilled through a subterranean formation. Information about the well structure, production completion, and production mechanisms may be contained in a wellbore schematic. Wellbore schematics may include the primary dimensions of well bore components and the depth at which the components are located within a reservoir. Wellbore schematics must be accurate and based off the most recent drilling data in order to enable operators to make decisions about equipment usage and drilling procedures. As completion rates change and the wellbore is drilled through varying subterranean characteristics, wellbore data should be analyzed and updated wellbore schematics generated.

BRIEF DESCRIPTION OF THE DRAWINGS

FIG. 6A-C show an example digital wellbore schematic suitable for use with some aspects of the disclosure.

DETAILED DESCRIPTION

Figure 1:
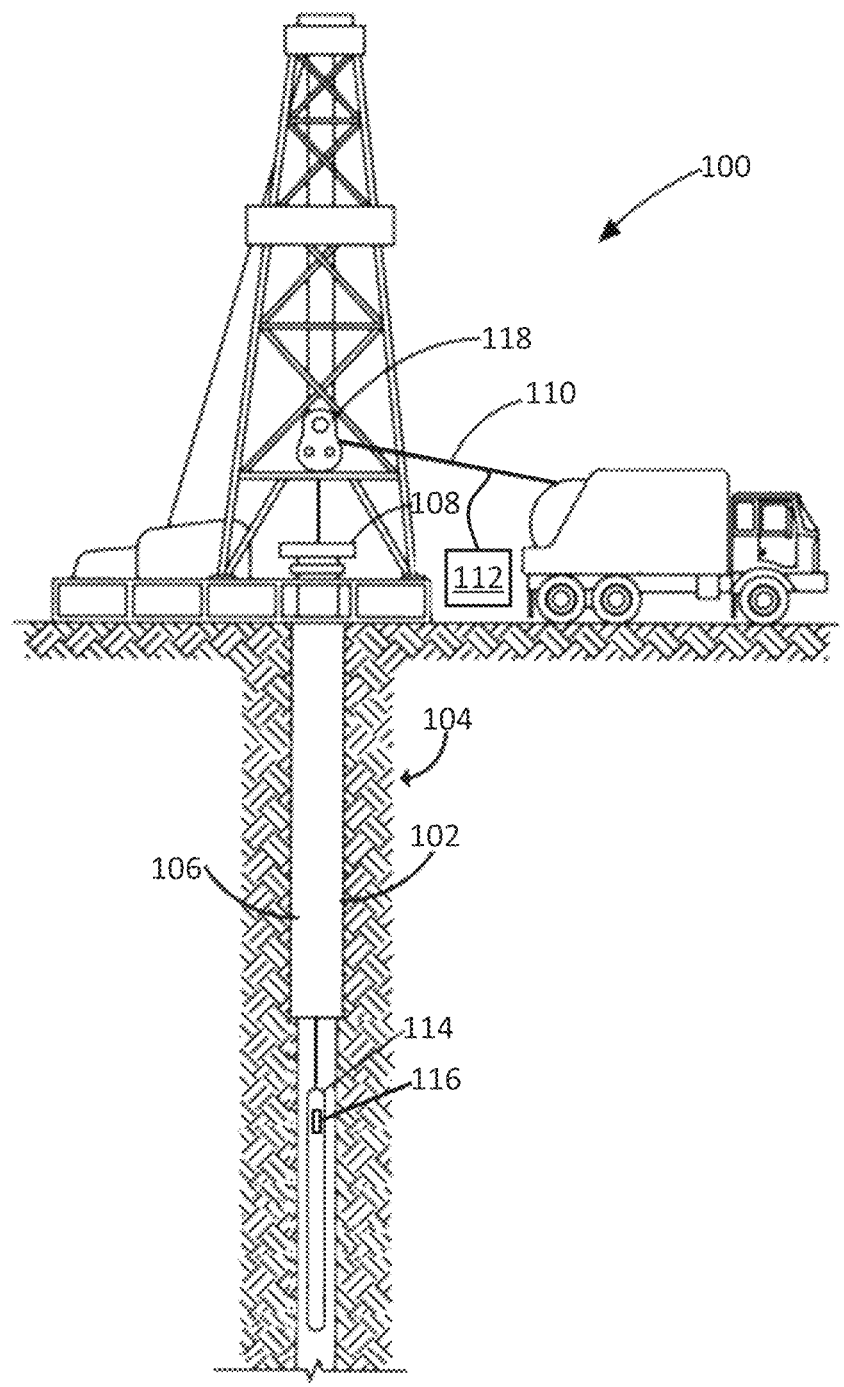
FIG. 1 is a cross-sectional view of an example of a well system according to some aspects of the disclosure.

Certain aspects and features of the present disclosure relate to analysis of physical media copies of wellbore schematics and the generation of corresponding digital wellbore schematics. Wellbore data may be analyzed by a wellbore schematic analysis tool to produce a structured data file containing information harvested from a physical media copy of a wellbore schematic. This information may be compared to data from other wellbores and may be used to generate a new digital wellbore schematic. Examples may leverage machine-learning techniques to learn wellbore features from an existing physical media wellbore schematic and use this data to generate digital wellbore schematics. The rapid generation of new wellbore schematics may enable more informed decisions about fuel asset procurement prior to well intervention.

Examples disclosed herein enable the interpretation and analysis of physical media wellbore schematics. Wellbore schematics are essential to well operations as they detail the well structure as well as the completions, and the production mechanism. Wellbore schematic diagrams are a visual representation of accumulated information from the daily reports of wellbore drilling activities. These reports may include information such as how far the drilling progressed on that day, what was recovered from the well, tools used, geography of the accessed portion of the well, and how long drilling took place. Generation of the wellbore schematic originally required manual review of report information to draw a wellbore schematic. The analysis of wellbore schematics used to be a manual effort, requiring long periods of time and requiring manual analysis by domain experts. The resource-intensive nature of generating updated wellbore schematics often resulted in workflow congestion and potentially a loss of economic resources.

The efficiency of analyzing physical media well bore schematics and generating digital wellbore schematics may be greatly increased through the use of a machine-learning tool. The analysis of a physical wellbore schematic presents a non-trivial problem in image analysis and text recognition, because the wellbore image is a two-dimensional or one-dimensional image including primarily vertical lines. The determination as to which vertical lines represent well features, and which lines represent drilling components, requires multiple passes of image recognition and parsing, guided by a set of engineering constraints established.

The machine-learning tool or wellbore schematic analysis tool may analyze physical wellbore schematics and generate corresponding digital diagrams. The wellbore schematic analysis tool may receive as input, document scans or digital pictures of physical media wellbore schematics. The wellbore schematic analysis tool may provide an initial analysis or assessment of the layout and features of the files. As new diagram layouts and features are acquired, the wellbore schematic analysis tool may be trained with a random sample of the new dataset. The trained wellbore schematic analysis tool may then generate models to analyze the various data in the files. This analysis results in a structured data file, which may be imported to well construction software to reconstruct a digital wellbore schematic or compare wellbore features across wellbores.

In an example, the wellbore schematic analysis tool uses a two-part analysis of a digital scan or image of physical media wellbore schematics to obtain information about the wellbore. The wellbore schematic analysis tool may use a combination of image and text detection to interpret and harvest information from the scan or image of the physical media wellbore schematics. Image detection operations may optionally occur multiple times and may result in classification and localization of the component features in the wellbore schematic diagram. The text detection operations resolve the location and content of each annotation feature in the wellbore schematics. These two results are then matched by location, features, and engineering constraints on the image. The combined result may be a structured data file including all the information harvested from the analysis of the physical media wellbore schematic.

In an example of the image detection operations, the wellbore schematic analysis tool may use a nested structure for object detection that depends on the amount of features and size of a specific component feature. Features of different sizes and structures may be detected in multiple rounds of object detection and parsing. Post-processing operations may re-examine and finalize the structured data file based on various criteria. Finally, a validation of the overall detection performance may be conducted.

Using some examples of the present disclosure can result in rapid analysis of wellbore schematic diagrams. Some examples of the present disclosure accurately and robustly predict changes in features of a physical media wellbore schematic diagram using machine-learning techniques to analyze existing wellbore historical data and may use this information to generate digital wellbore schematics Some examples of the present disclosure enable the detection and analysis of wellbore schematic features and patterns that may not be accomplished through manual techniques.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional side view of an example of a well system 100 according to some aspects. The well system 100 includes a wellbore 102 extending through a hydrocarbon bearing subterranean formation 104. In this example, the wellbore 102 is vertical, but in other examples the wellbore 102 can additionally or alternatively be horizontal or deviated.

In this example, the wellbore 102 includes a casing string 106 (e.g., a metal casing) extending from the well surface 108 into the subterranean formation 104. The casing string 106 can provide a conduit via which formation fluids, such as production fluids produced from the subterranean formation 104, can travel from the wellbore 102 to the well surface 108. In other examples, the wellbore 102 can lack the casing string 106.

The wellbore 102 can include a well tool 114 for performing one or more tasks in the wellbore 102. Examples of the well tool 114 can include a safety tool, valve tool, packer tool, drilling tool, monitoring tool, formation testing tool, a logging while drilling tool, or any combination of these. In some examples, the well tool 114 is deployed in the wellbore 102 using a wireline 110, slickline, or coiled tube, which can be wrapped around a winch 118 or pulley at the well surface 108.

The well system 100 can also include a computing device 112. The computing device 112 can be positioned at the well surface 108 or elsewhere (e.g., offsite). The computing device 112 may be in communication with the well tool 114, a camera, a sensor, or another electronic device for gathering information from which a schematic of the wellbore can be produced. For example, the computing device 112 can have a communication interface for transmitting information to and receiving information from another communication interface 116 of the well tool 114.

In some examples, the computing device 112 can receive information from downhole (or elsewhere) in substantially real time, which can be referred to as real-time data. The real-time data can include information related to the well system 100. For example, the well tool 114 can stream real-time data to the computing device 112, where the real-time data includes information about the formation or location of the well tool 114 in the wellbore 102.

Figure 2:
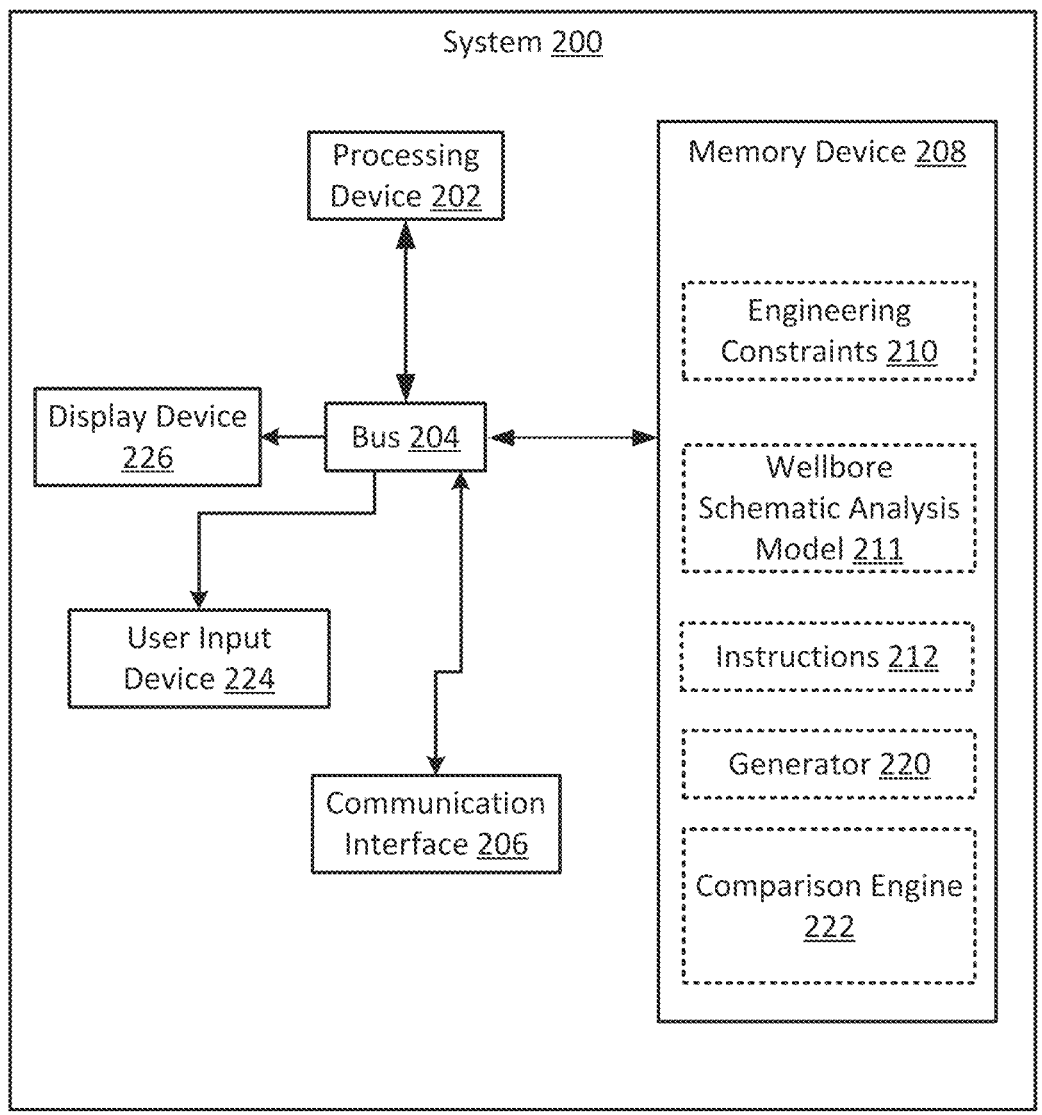
FIG. 2 is a schematic diagram of a system for analyzing an existing physical wellbore schematic and generating a digital wellbore schematic according to some aspects of the disclosure.

FIG. 2 is a schematic diagram of system 200 for analyzing an image of a physical media wellbore schematic diagram and generation of a corresponding digital wellbore schematic diagram. Computer program instructions 212 can be executed by a processor to analyze an obtained image of a physical media wellbore schematic diagram and harvest information using a wellbore schematic analysis tool 211. A digital wellbore schematic diagram may be generated by the generator 220 using engineering constraints 210 applied to a structured wellbore schematic data file output of the wellbore schematic analysis tool 211. Further the structured wellbore schematic data output of the wellbore schematic analysis tool 211 may be compared to wellbore schematic data produced for another wellbore. The comparison engine 222 may compare the data entries in the structured wellbore schematic data file to that produced for another wellbore in order to identify any differences.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory computer-readable medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In this example, the memory device 208 includes engineering constraints 210. The memory device 208 in this example also includes a wellbore schematic analysis model 211 to provide engineering constraints imposed by the drilling environment that can be accessed and used to analyze and learn the features of an image of a wellbore schematic. In this example, the memory device 208 includes computer program code instructions 212 for acquiring data and causing generator 220 a new digital wellbore schematic diagram. The results of the wellbore schematic analysis model 211 may also be used by comparison engine 222 to assess and identify differences between wellbore schematics of different wellbores.

In some examples, the system 200 includes a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the system 200 includes a user input device 224. The user input device 224 can represent one or more components used to input data. Examples of the user input device 224 can include a keyboard, mouse, touchpad, button, or touch-screen display, etc. In some examples, input device 224 may also include an image sensor such as a scanner or camera, which may be used to obtain an image of a physical media wellbore schematic.

In some examples, the system 200 includes a display device 226. The display device 226 can represent one or more components used to output data. Examples of the display device 226 can include a liquid-crystal display (LCD), a television, a computer monitor, a touch-screen display, etc. In some examples, the user input device 916 and the display device 226 can be a single device, such as a touch-screen display. System 200 can be implemented using computing device 112 of FIG. 1 or using a computing device remotely located from well system 100. In the latter example, computing device 112 may send data gathered at well system 100 to system 200.

Figure 3:
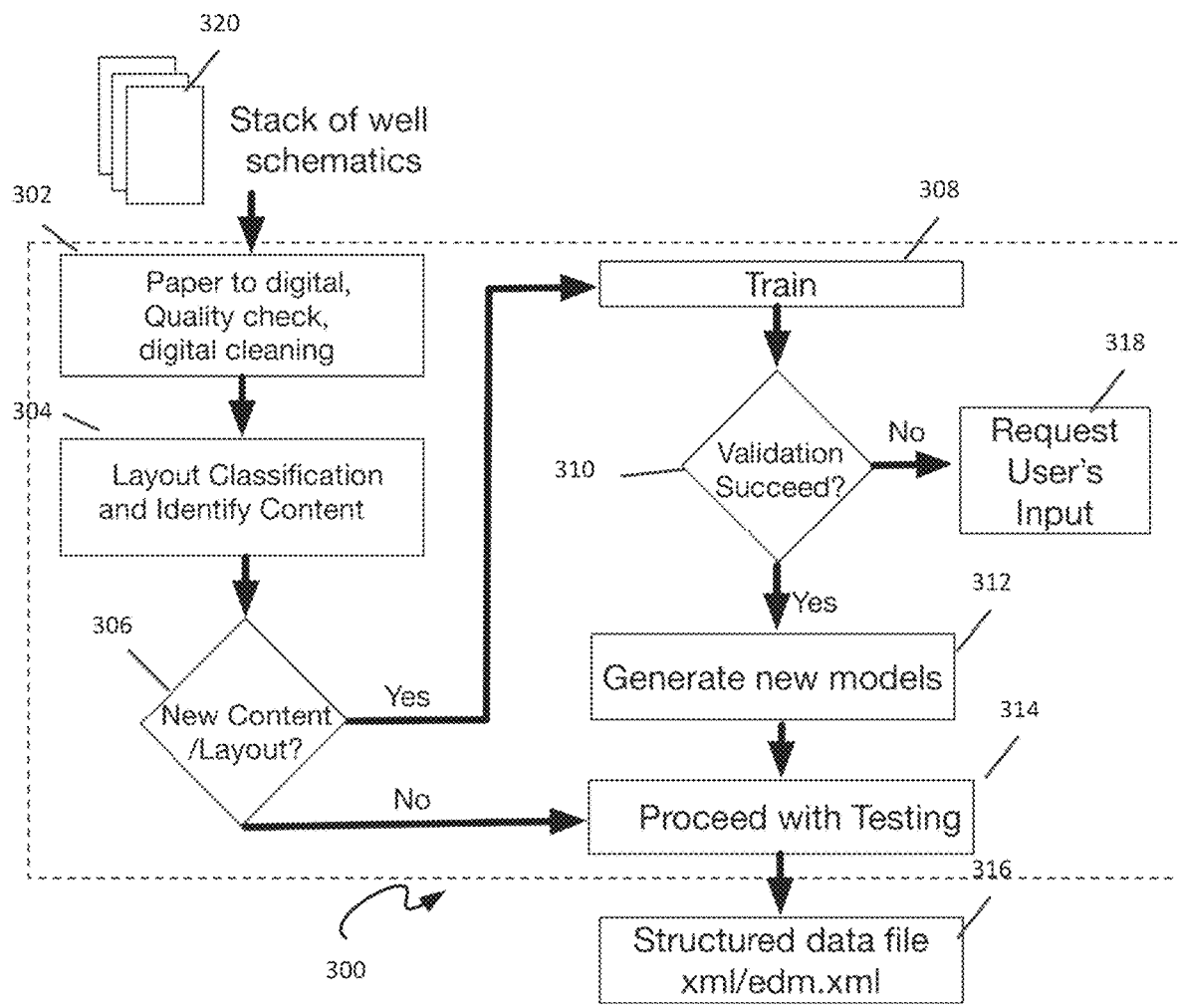
FIG. 3 is a process flow diagram of a method for analyzing a physical wellbore schematics according to some aspects of the disclosure.

FIG. 3 is a process flow diagram of a method 300 for analyzing a physical wellbore schematics according to some aspects. The illustrated method may provide for interpretation and analysis of a stack of scanned or digital images 320 of wellbore schematics. Various examples of the illustrated method may produce a structured wellbore schematic data file 316, which may be used to regenerate digital wellbore schematics in well construction software.

In some examples, in block 302, the stack of digital images 320 may be captured using an image sensor such as a scanner or camera in wellbore 102 of FIG. 1. The image sensor may be input device 226 of FIG. 2 or may be a distinct input device. In some examples, the digital images 320 may be obtained via communication interface 206 of FIG. 2 such as by downloading, receiving a transmission, or transfer from a removable memory. The stack of digital images 320 may contain images having varying layouts, such as one-dimensional, two-dimensional, or three-dimensional. Each of the digital images may have a variety of information display on the wellbore schematic. Such information may be part of the visual representation of the wellbore, such as geometry, subterranean characteristics, positioning of components within the wellbore, depth, etc. Other information contained in the wellbore schematics may include textual comments about depth, global positioning system (GPS) coordinates, liturgy, broken pieces, issues, etc. The digital images 320 may be cleaned such as by using image processing applications to remove artifacts, adjust contrast, and brightness, and the like.

In block 304, the processing device 202 may identify a layout type or classification of the stack of digital images 320. That is, the processing device 202 may analyze the wellbore schematics depicted in the digital images 320 to identify whether the layout is one-dimensional, two-dimensional, three-dimensional, portrait, landscape, etc. Further detail about layout type identification is provided with reference to FIG. 4. Identification of the proper layout type for each of the digital images 320 may greatly improve the object detection capabilities of the wellbore analysis model. The wellbore analysis model 211 may be used by processing device 212 to identify features of the wellbore schematics depicted in the digital images 320. The detection of features such as text-based content features and image-based component features may be described in greater detail with reference to FIGS. 5, 8, and 9.

In determination block 306, the processing device 202 may determine whether the identified features are new. For example, the processing device 202 may analyze the identified features and determine whether these types of features are already represented in the various classification models of the wellbore analysis model 211. In some examples, the classifications models of the wellbore analysis model may be neural networks, decision trees, boosted decision stumps, or other forms of supervised machine-learning models which may have been trained to identify and classify features of a wellbore schematic diagram.

In response to determining that the identified features are not new (i.e., determination block 306="no"), the processing device 202 may proceed with testing in block 314. Testing may be the application of the wellbore schematic analysis model to the digital images 320 to harvest features from the images. The features may include content features detected through text recognition operations such as optical character recognition. These features may provide location information of wellbore components, depth information, drilling problems/issues, liturgy, etc. The features may also include component features such as wellbore geometry, machinery components, and the like. The features extracted or harvested from the digital images 320 may be stored in structured wellbore schematic data 316, which are files containing data associated with the extracted features in a template format. The file format may be flexible, such as any of the variety of markup languages, but the data contained therein may be organized in a template fashion to enable easy reading of the file data by any compatible wellbore software application.

In response to determining that the identified features are new (i.e., determination block 306="yes"), the processing device 202 may in block 308, continue training the wellbore analysis model 211. One of more of the classification models of the wellbore schematic analysis model 211 may be trained using supervised machine-learning techniques. The new features may be provided to the model as input and training operations described in greater detail with reference to FIG. 9, may be implemented to teach the wellbore analysis model to identify the features. A variety of supervised machine-learning techniques may be utilized. In some examples the same form of supervised machine-learning may be used to generate a first classification model for use in identifying features, a second classification model for identifying another type of features, a third classification model for identifying additional features, and a layout classification model for detecting the layout type of a digital image. Some forms of classification and feature identification may require less resource intensive analysis. For example layout classification may have relatively few possible classifications such as one-dimensional, two-dimensional, portrait, landscape, etc., and thus may be implemented using machine-learning models that are less robust, but less resource intensive.

In determination block 310, the processing device 202 may determine whether the outcome of the wellbore schematic analysis model training is valid. Digital images 320 containing the new feature(s) may be resubmitted, by returning to block 304 to identify the features in the digital images 320. If the identified features not identified as new in determination block 306, then then training may be valid (i.e., determination block 310="yes"). The processing device 202 may generate updated versions of one or more of the classification models of the wellbore schematic analysis model 211 in block 312. The updated wellbore schematic analysis model 211 may be used to test the digital images 320 in block 314.

In response to determining that the outcome of the wellbore schematic analysis model training is not valid (i.e., determination block 310="no"), the processing device 202 may display an alert via display 206 indicating that the input of an engineer user is requested to remedy the validation failure. Similarly, the processing device 202 may transmit a notification or alert via communication interface 206, indicating the need for engineering user assistance.

Figure 4:
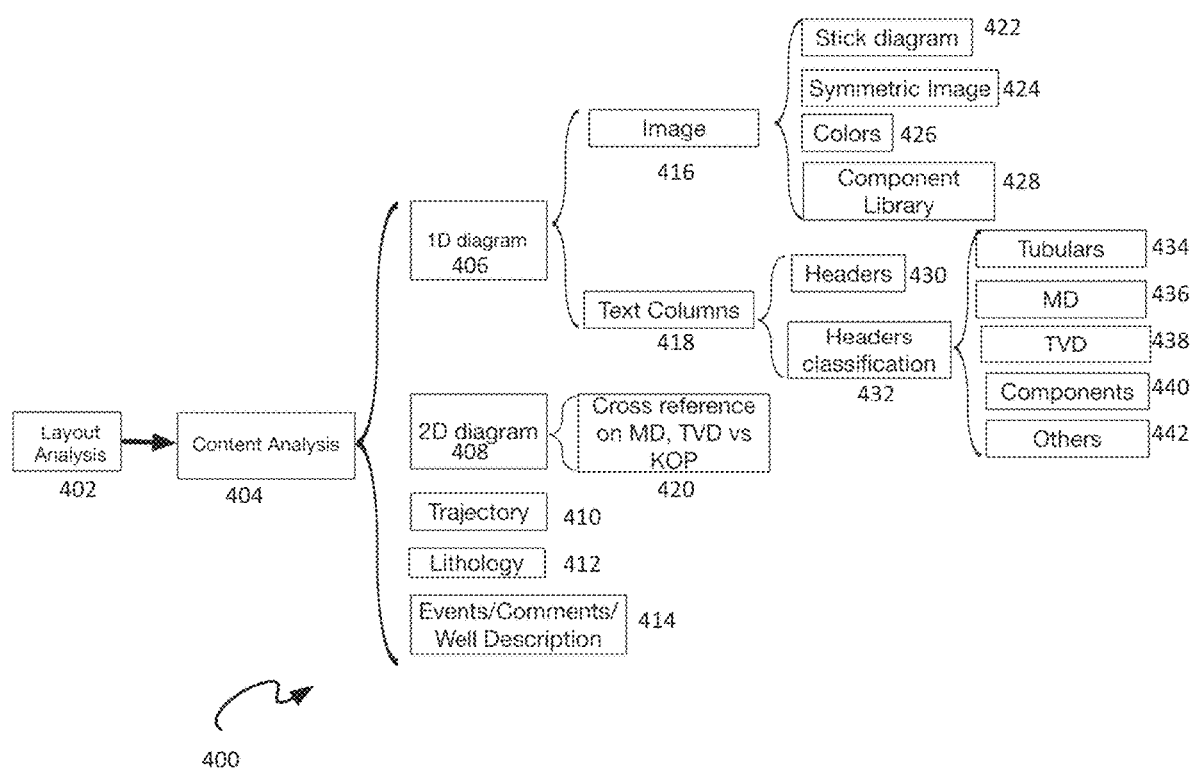
FIG. 4 is an organizational diagram of a method for layout classification and feature identification within an image of a wellbore schematic according to some aspects of the disclosure.

FIG. 4 is an organizational diagram of a method for layout classification and feature identification within an image of a wellbore schematic according to some aspects. More specifically, FIG. 4 illustrates an example method for digital image layout classification and feature identification corresponding to block 302 of FIG. 3.

During execution of the method 400, the layout of each new digital image (i.e., digital images 320) will be assessed and classified in block 402, then the features will be analyzed to determine the type of feature data is available in the digital image file in block 404.

Layout analysis may result in a classification of the wellbore schematic diagram of a digital image as being one-dimensional 406 or two-dimensional 408. Two-dimensional diagrams may be easier from which to extract or harvest information because these diagrams may provide clear indication as to the rise and spread of physical components within the wellbore as well as the well-bore geometry. Conversely, one-dimensional diagrams may be difficult to analyze and present a non-trivial problem in object detection. This is because one-dimensional wellbore schematic diagrams are one-dimensional and comprised of primarily vertical lines, such as wellbore schematic diagram 600 of FIG. 6. The wellbore schematic diagram may contain lines depicting the beginning and end of a perforation, the end of a casing, tubing, and other details that may be difficult to resolve when illustrated in columns of vertical lines.

Layout analysis may also include the detection of lithology 412, trajectory 410 of the wellbore within the ground, and wellbore description/comments 414. Any of these features may be provided in text appearing on the diagram or may be determined from an analysis of the wellbore geometry.

In digital images in which the illustrated wellbore schematic diagram is two-dimensional 408, feature analysis 404 may include a comparison of detected wellbore characteristics/component features to a measured depth (MD), true vertical depth (TVD), and kick-off point (KoP) 420.

The layout of a one-dimensional diagram may generally include a type of image and text columns. The feature analysis 404 may include both image analysis or object detection 416 and text or character recognition 418. The image may be a stick diagram 422, representing half of the wellbore or a symmetric image 424 representing the complete file. It may have colors 426 associated with each component. More diverse one-dimensional images would include a component library 428.

The text recognition 418 of text columns would provide details on features such as depths and diameters. The text columns may include headers 430 and associated header classifications 432. For example, header classifications may include tubulars 434, MD 436, TVD 438, component feature 440, and other information 442.

Figure 5:
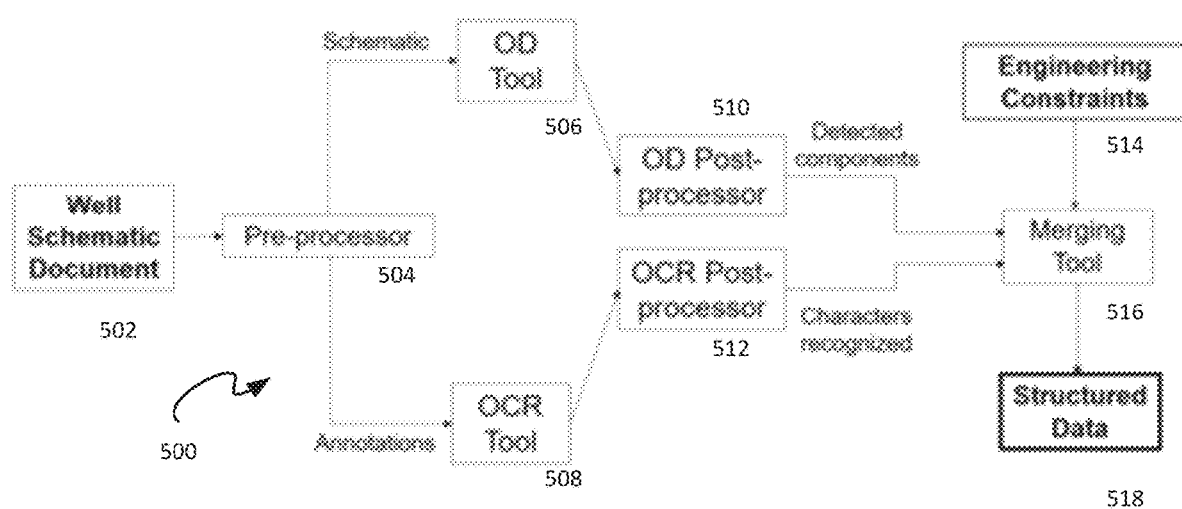
FIG. 5 is a process flow diagram of physical wellbore schematic analysis according to some aspects of the disclosure.

FIG. 5 is a process flow diagram of physical wellbore schematic analysis according to some aspects. The method 500 provides operations for the analysis of a physical media wellbore schematic document 502, which may be associated with a digital image from the stack of digital images 320 of FIG. 3. The output of method 500 may be a structured wellbore schematic data file which may be used for comparing wellbore information for different wellbores and/or for generating corresponding digital wellbore schematic diagrams. The method 500 may provide the workflow of the wellbore schematic analysis tool analysis of wellbore schematics with a layout that includes a symmetric one-dimensional image and text columns. In this process the diagram and text data are analyzed individually in an object detection tool and an optical character recognition tool, respectively.

In block 504, the wellbore schematic diagram 502 may be subjected to preprocessing. For example, the document may be scanned or photographed to obtain a digital image. Color correction, contrast adjustment, annotation, schematic symbol modification, and artifact removal may be performed to prepare the digital image of the wellbore schematic document for analysis. Further detail on pre-processing operations is provided with reference to FIG. 7.

In block 506, an image recognition or object detection operation 506 may receive the pre-processed schematic. At least one image recognition classifier model (e.g., a first and third) may be applied to the pre-processed schematic to detect component features. For example, a first classifier model may be applied to the pre-processed schematic to identify perforations, tubing, and large wellbore features. These features may then be parsed or removed from the pre-processed schematic and an additional classifier model may be applied to identify small component features such as casing tips and minor depth changes. The pre-processed schematic and the identified component features may be passed as input to the post-processing operation in block 510 for organization and structuring within the file. This information may then be passed to the merging tool 516.

In block 508, a pre-processed annotation of the wellbore schematic diagram may be passed to a text recognition or OCR operation. The OCR operation may analyze the pre-processed annotations to retrieve content features contained with the text columns of the wellbore schematic diagram document 502. The extracted features may be passed to a text post-processing operation 512 and then onward to the merging tool 516.

In block 516, the merging tool may combine the extracted text characters, i.e., the content features and the identified component features and may organize the combined information into a structure wellbore schematic file 518. The data included in the structure wellbore schematic data file 518 may be constrained by engineering constraints 514. These engineering constraints 514 may represent institutional knowledge of those skilled in the art of well engineering, and may include rules for well component placement, KoP placement, asset extraction strategies, extraction eclusion zones, depth restrictions, and the like. The engineering constraints 514 may also include pertinent regulatory restrictions or requirements.

Figure 6A:
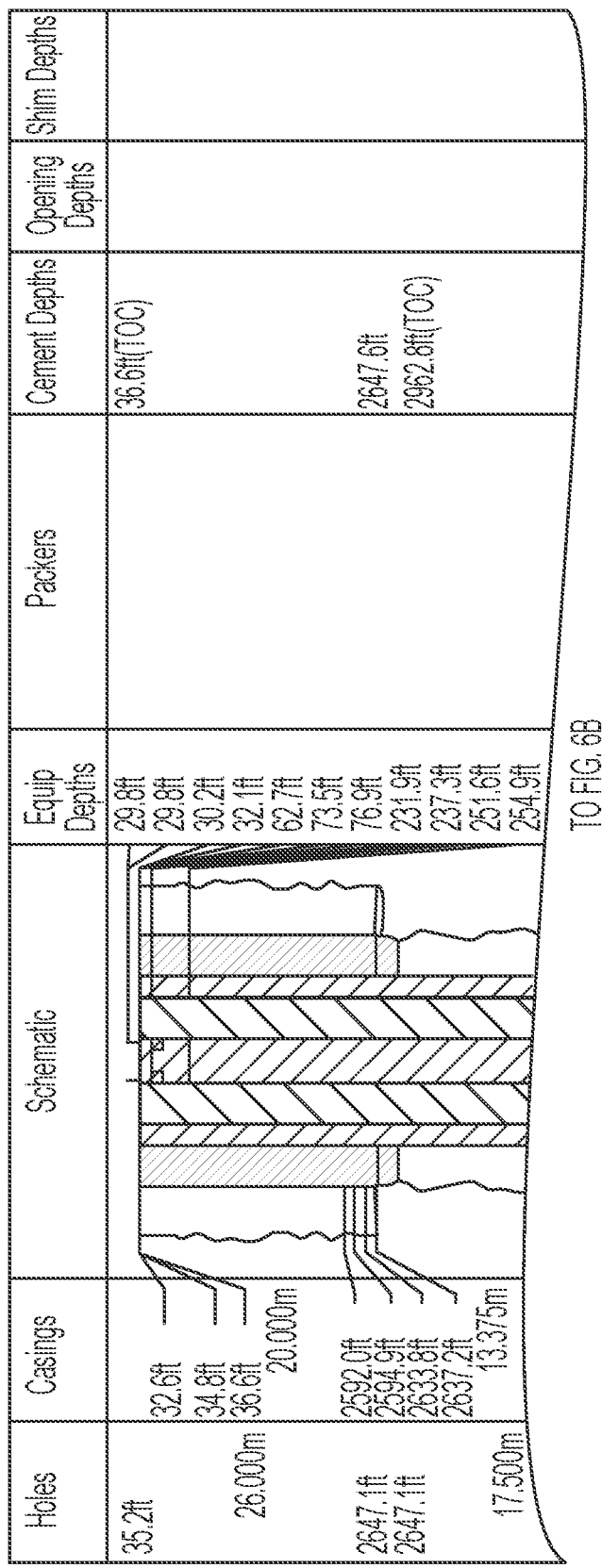
Figure 6B:
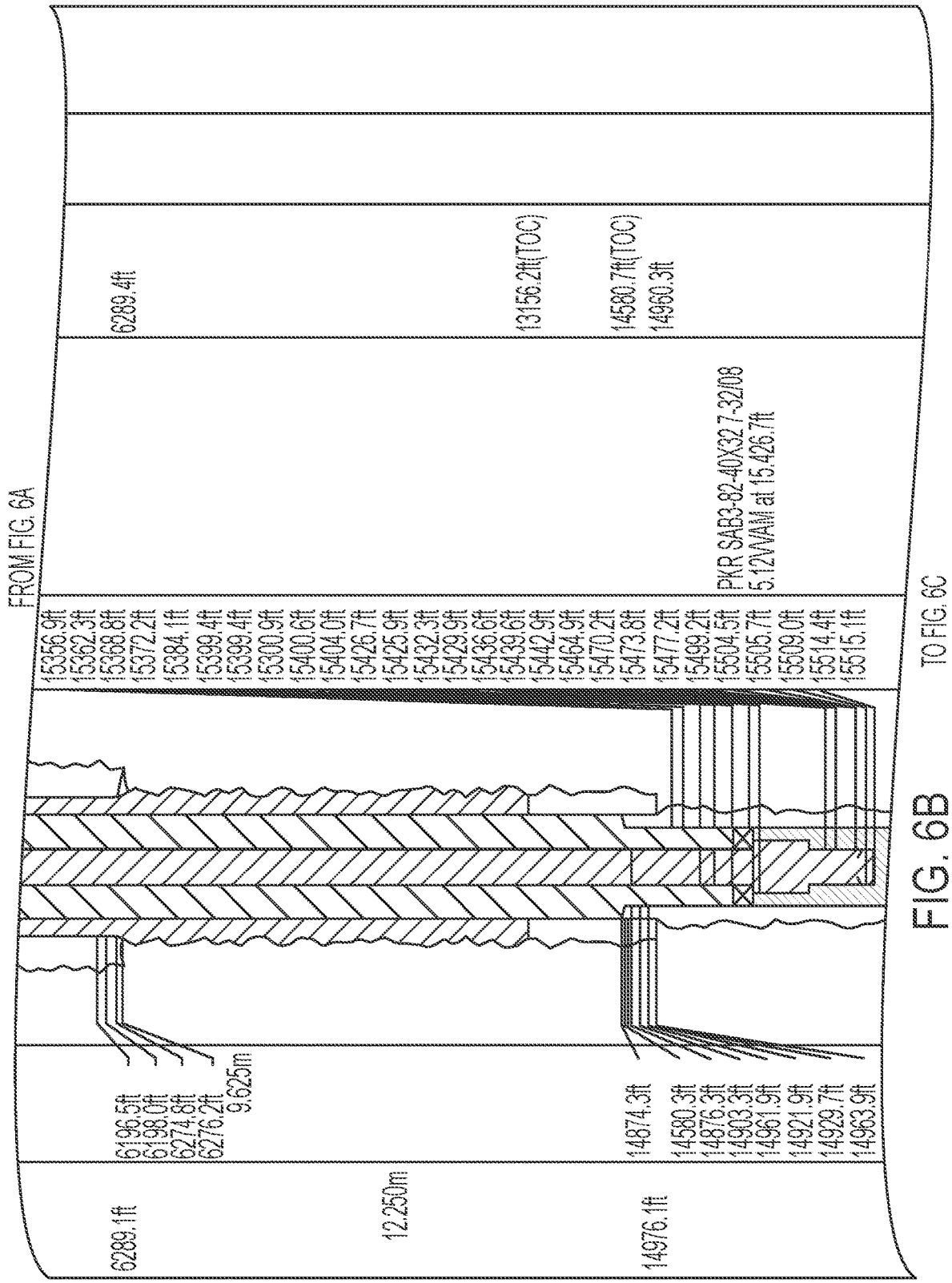

FIG. 6 is an example digital wellbore schematic suitable for use with some aspects. The wellbore schematic diagram 600 is a symmetric one-dimensional layout diagram. Multiple text columns provide content features including information about drilling history, depths, machinery types, and more. Such a digital wellbore schematic diagram may be produced by providing the structured wellbore diagram data 518 to a wellbore schematic generation application. Typical text information, such as may be represented in FIG. 6 with horizontal lines, i.e. content features, included in the wellbore schematic diagram may include those shown in datable 1.

DATA TABLE 1

| Content Features | | | | |
|---|---|---|---|---|
| Opening Depths | Equip. Depths | Holes | Casings | Packers |
| 2781.50 m | 6.14 m | 34.00 m | 7.20 m | 9.5/8" × 7.0" LNER |
| 2811.70 m | 6.92 m | 26.000 in | 7.20 m | TIEBACK PACKER, CP H, 18- |
| 2864.00 m | 9.12 m | 403.00 m | 7.36 m | 22Rc, 15 FT at 2,273.20 m |
| 2867.00 m | 9.44 m | 18.500 in | 7.70 m | 7.0" × 5.0" PACKER, |
| 2868.00 m | 111.73 m | 1307.00 m | 8.98 m | 82SAB40, N-VAM BOX, 4140 |
| 2876.00 m | 111.74 m | 12.250 in | 7.76 m | at 2,729.42 m |
| 2885.00 m | 112.04 m | 2337.00 m | 9.56 m | 5.0" × 3.1/2" PACKER, |
| 2892.00 m | 113.94 m | 8.375 in | 28.000 in | 32FAB30, N-VAM BOX, 4140 |
| 2894.50 m | 115.74 m | 2845.10 m | 33.50 m | at 2,930.00 m |
| 2898.50 m | 115.75 m | 5.875 in | 34.00 m | 5.0" × 3.1/2" PACKER, |
| 2950.00 m | 116.44 m | 3127.00 m | 20.000 in | 32DB25, N-VAM, 4140 at |
| 2966.50 m | 115.76 m | | 201.98 m | 2,995.50 m |
| 2975.00 m | | | 214.59 m | |
| 2985.00 m | | | 399.53 m | |
| 2986.00 m | | | | |

Figure 7:
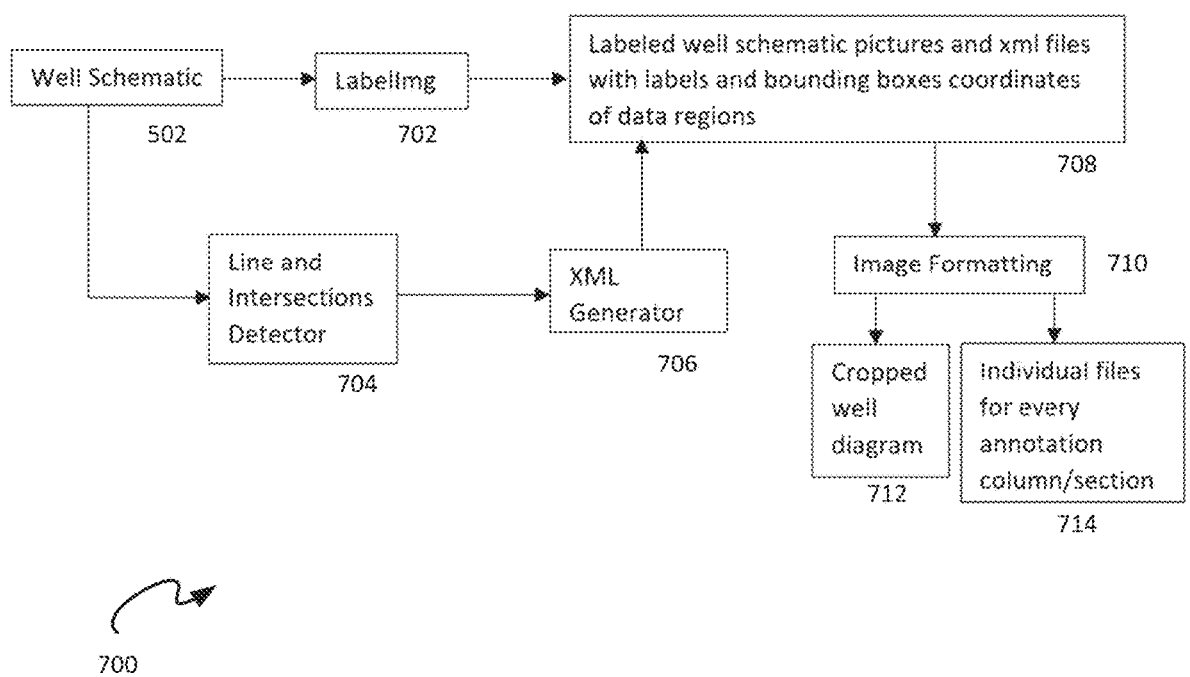
FIG. 7 is a process flow diagram of a method for pre-processing of images of wellbore schematics according to some aspects of the disclosure.

FIG. 7 is a process flow diagram of a method for pre-processing of images of wellbore schematics according to some aspects. Method 700 may correspond to block 504 pre-processing operation of FIG. 5. The illustrated method 700 provides an overview of the preprocessing workflow, in which the different regions of data on the digital image file (i.e., digital image 320) are extracted in individual files.

The wellbore schematic diagram 502 may be subjected to pre-processing to identify structural and administrative information. The pre-processing operation may identify labels 702 and lines, intersections, and structural organization elements 704. The line and intersection detector 704 may pass detected structural elements to a markup generator 706 such as an xml generator. The generated markup and the labels may be combined in block 708.

The digital image may be formatted in block 710 to produce a cropped wellbore schematic 712 and text annotations 714. These may be individual documents ready for analysis by the classification models of the image-recognition, object detection operations, text recognition, and OCR operations disclosed in FIG. 5.

Figure 8:
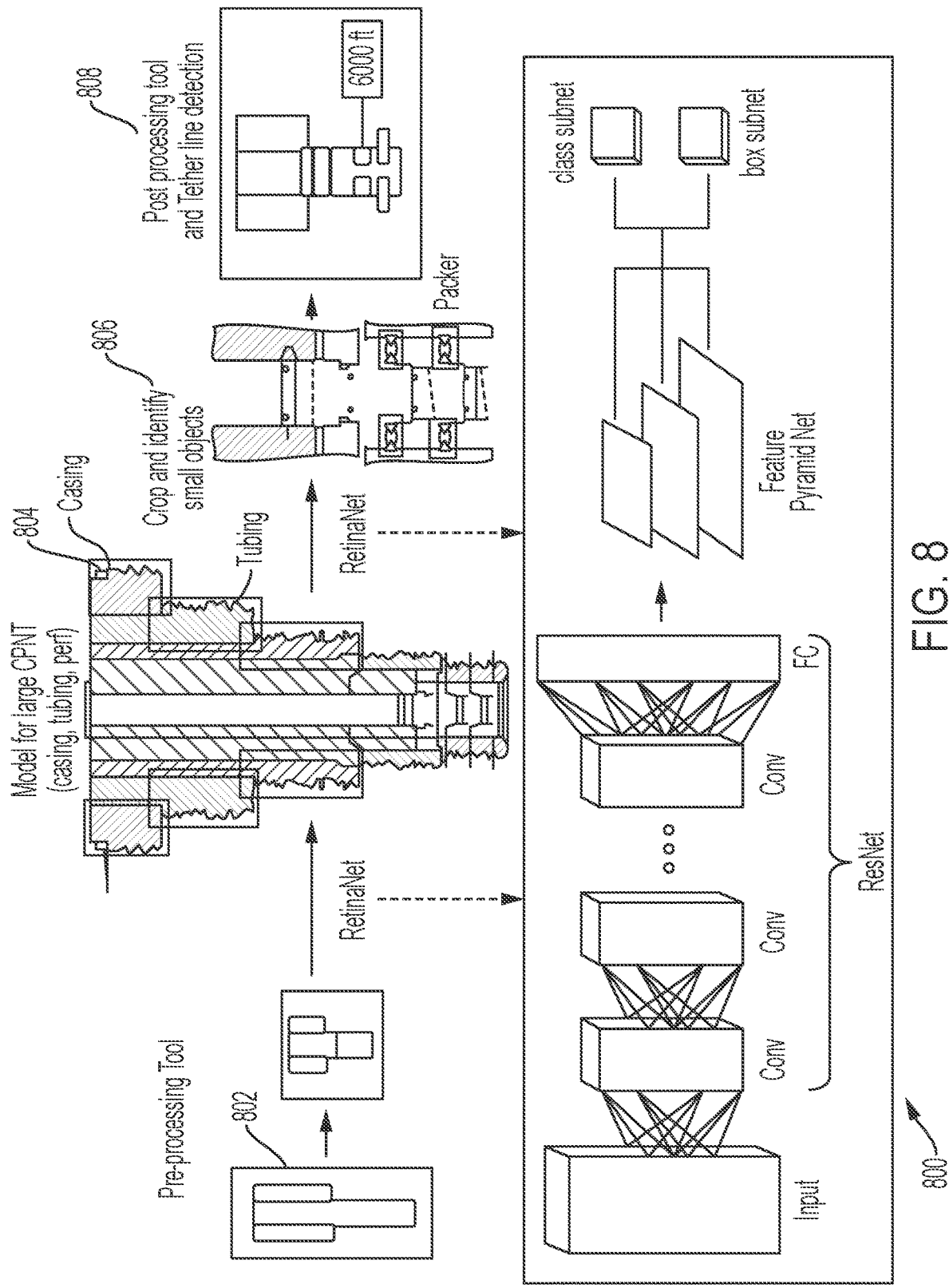
FIG. 8 is a process flow diagram of a method for image recognition by a wellbore schematic analysis model according to some aspects of the disclosure.

FIG. 8 is a process flow diagram of a method for image recognition by a wellbore schematic analysis model according to some aspects. The method 800 may provide for image recognition and object detection of component features within a wellbore schematic diagram using an existing set of classifier models.

A pre-processed or "plain" schematic 802 may be provided to the image recognition operations to identify component features. The original image and a corresponding labeling file (i.e., intermediary file) may be examined using a preprocessing tool that checks whether labeled ground-truth boxes are considered during the training process. This step helps ensure the training dataset is of good quality before training starts, saving significant time and resources. If the program does not identify a considerable amount of ground-truth boxes, image size and box size should be adjusted for a validated input dataset. This may compensate for the tendency of traditional image generation and recognition software to produce images using boxes rather than lines. After the program accepts the training dataset, neural network training resumes.

In an example, the neural network architecture may be a RetinaNet model that implements Feature Pyramid Network+ResNet. It is composed of convolutional layers, fully connected layers, max pooling layers, ReLU layers, and batch norm layers arranged so that important features in the image may be extracted to a feature map with tuning on the weights of each layer. On top of each feature map, a small head consisting of class and box subnets is implemented. Those two subnets of fully connected layers are designed to output the box coordinates (using regression) and probability of the class (using the softmax function) separately. Each training iteration involves optimization procedures to update the weights on each layer as a result of minimizing the loss function.

In block 804, a first classifier model may be applied to the pre-processed schematic image. The first classifier model may be trained to classify large objects illustrated within the pre-processed schematic. Such objects may include casings, tubings, perforations, large well geometry features, other machinery components, and the like. These features may be a setoff component features. The classified component features may be added to an intermediary file of component features.

In block 806, the component features identified by the first classifier model may be cropped or otherwise removed from the pre-processed schematic image. For example, the vertical lines that are classified by the first classifier model as belonging to a component feature, may be stripped from or deleted from the pre-processed schematic image. Then, another classifier model such as a second or third classifier model may be applied to the modified pre-processed schematic image. The additional classifier model may be trained to identify small objects within the pre-processed schematic image. The newly identified component features may be added to the intermediary file. The process of removing identified component features and classifying different types and sizes of component features in the pre-processed schematic 802 may continue until all component features are identified and added to the intermediary file.

In block 808, the extracted or harvested component features in the intermediary file may be subjected to post-processing operations and validated for accuracy.

The component features identified by the various classification models may be compared to horizontal lines appearing in the pre-processed schematic to tether the various component features to depth information. The intermediary file may be updated to include depth information associated with each component feature.

Further, GPS coordinates associated with different parts of the wellbore may be tethered to the identified component features. For example, the left and ride side of the wellbore at varying depths may have known FPS coordinates. Component features appearing in the pre-processed schematic 802 may be compared to the known GPS coordinate information (such as that appearing in text columns) to determine the global positioning information of different component features within the wellbore.

In some examples, new classifier models for detecting component features within a wellbore schematic may be trained using a similar workflow, and incorporating the pre-processing operations discussed in greater detail with reference to FIG. 7.

Figure 9:
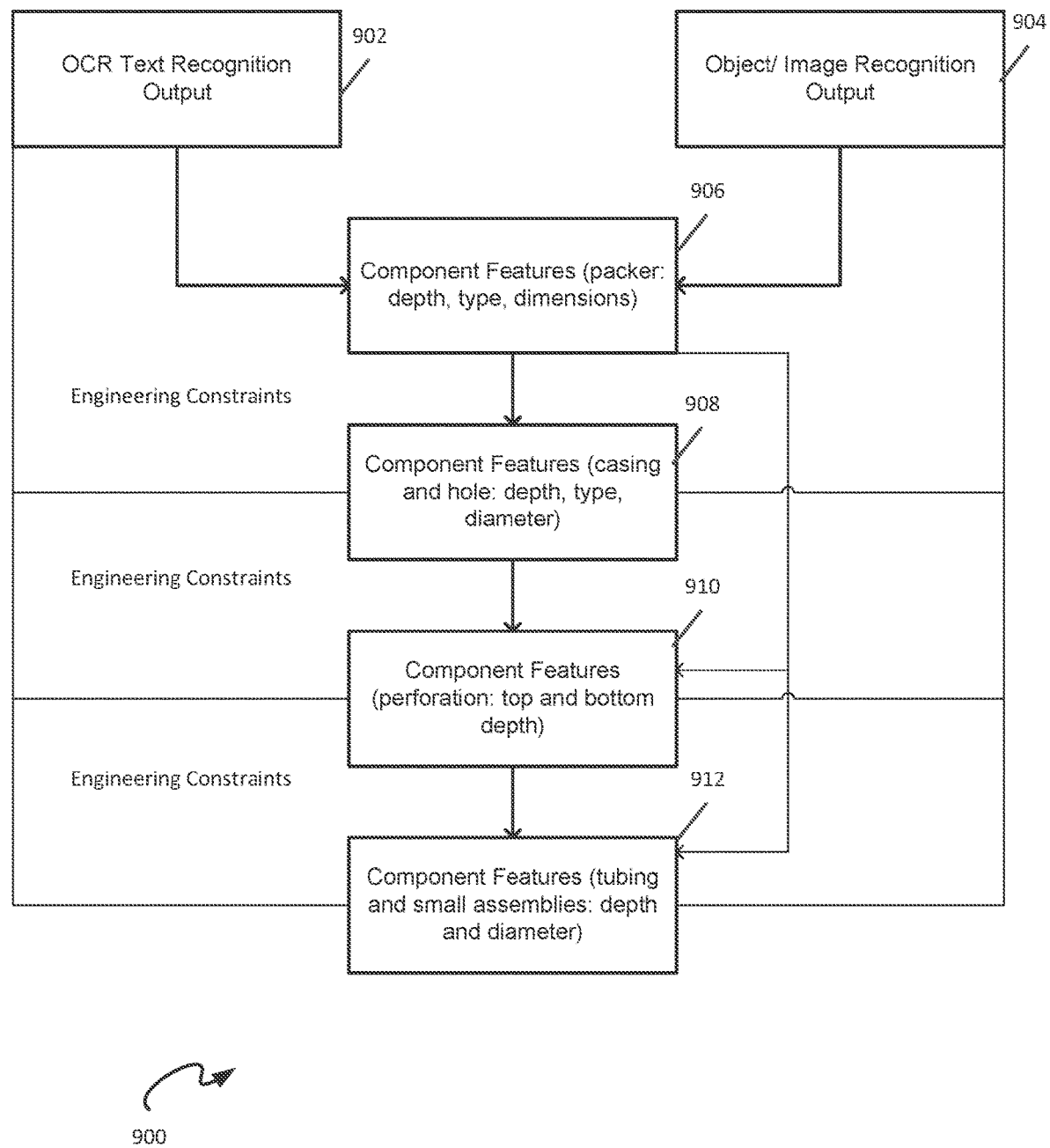
FIG. 9 is a process flow diagram of a method for merging generated wellbore schematic information according to some aspects of the disclosure.

FIG. 9 is a process flow diagram of a method for merging generated wellbore schematic information according to some aspects. The method 900 may correspond to block 516 in FIG. 5. The result of a text recognition or OCR operation, i.e. OCR output 902 and the result of an image recognition or object detection operation, i.e. OD output 904 may be merged during process 900 to produce the structured wellbore schematic data (i.e., structured wellbore schematic data 518). Method 900 may include matching the outputs and ensuring that the merged data complies with engineering constraints (e.g., engineering constraints 514).

In block 906, component features of the OCR output 902 and component features of the OD output 904 that relate to the packer may be merged and compared to engineering constraints. Packer features such as depth, type, dimensions, tubings and packers, liners and packers, and the like may be engineering constraints or rulesets applied to guide the merger of feature information related to the packer assembly.

In block 908, component features of the OCR output 902 and component features of the OD output 904 that relate to holes and wellbore depth may be merged and compared to engineering constraints. Hole depth, hole diameter, casing type, and liner top depths may be engineering constraints applied to the features being merged. Casing types may include, for example, cassion pipe, conductor pipe, surface casing, intermediate casing, production casing, and liners.

In block 910, component features of the OCR output 902 and component features of the OD output 904 that relate to perforations may be merged and compared to engineering constraints. Such engineering constraints may relate to correct perforation clusters.

In block 912, component features of the OCR output 902 and component features of the OD output 904 that relate to smaller assemblies of the wellbore machinery. These smaller assemblies, which may have been identified by a second of third classifier model, may be compared to engineering constraints and merged. Engineering constraints may include tubing type and length, liners, liner hangers, as well as the size and diameter of small assemblies.

The merged features, subject to engineering constraints, may be included in a structured wellbore schematic diagram.

In some aspects, systems, devices, and methods for iterative steering of a drill bit are provided according to one or more of the following examples:

As used below, any reference to a series of examples is to be understood as a reference to each of those examples disjunctively (e.g., "Examples 1-4" is to be understood as "Examples 1, 2, 3, or 4").

Example #1: A computing device including a processing device, and a non-transitory memory device comprising instructions that are executable by the processing device to cause the processing device to perform operations including: obtaining an image of a physical media wellbore schematic diagram for a wellbore; identifying a layout type of the physical media wellbore schematic diagram in the image; performing text recognition and image recognition on the image to detect text information and object information based on the identified layout type; classifying the text information into content features using a first classification model; classifying the object information into component features using a second classification model; and applying engineering constraints to the content features and component features to produce structured wellbore schematic data.

Example #2: The computing device of example 1, the operations further including applying a generation model to the structured wellbore schematic data to generate a digital wellbore schematic corresponding to the physical media wellbore schematic diagram.

Example #3: The computing device of example 2, such that applying a generation model to the structured wellbore schematic data to generate a digital wellbore schematic corresponding to the physical media wellbore schematic diagram comprises: extracting component features and content features from the structured wellbore schematic data; and generating a digital wellbore schematic diagram including visual representation of the content features and component features.

Example #4: The computing device of any of any of examples 1-3, the operations further including: editing the image to remove the classified component features; performing image recognition on the edited image to detect additional object information; and classifying the additional object information into component features using a third classification model.

Example #5: The computing device of any of examples 4, such that the additional object information relates to component features that differ in at least one or size or type from the component features related to the object information.

Example #6: The computing device of any of any of examples 1-5, the operations further including: comparing the structured wellbore schematic data to a second structured wellbore schematic data associated with a second wellbore to identify differences in component features and content features; and adjusting drilling operations associated with at least one of the wellbore or the second wellbore, based on the identified differences in component features or content features.

Example #7: The computing device of any of any of examples 1-6, such that component features include at least two of casing, tubing, perforation, liner, packer, or machinery information and wherein content features include at least two of depth information, location information, assess procurement, length of time drilled, or remaining asset.

Example #8: A non-transitory computer-readable medium that includes instructions that are executable by a processing device for causing the processing device to perform operations including: obtaining an image of a physical media wellbore schematic diagram for a wellbore; identifying a layout type of the physical media wellbore schematic diagram in the image; performing text recognition and image recognition on the image to detect text information and object information based on the identified layout type; classifying the text information into content features using a first classification model; classifying the object information into component features using a second classification model; and applying engineering constraints to the content features and component features to produce structured wellbore schematic data.

Example #9: The non-transitory computer-readable medium of example 8, such that the operations further comprise applying a generation model to the structured wellbore schematic data to generate a digital wellbore schematic corresponding to the physical media wellbore schematic diagram.

Example #10: The non-transitory computer-readable medium of example 9, such that applying a generation model to the structured wellbore schematic data to generate a digital wellbore schematic corresponding to the physical media wellbore schematic diagram includes: extracting component features and content features from the structured wellbore schematic data; and generating a digital wellbore schematic diagram including visual representation of the content features and component features.

Example #11: The non-transitory computer-readable medium of any of examples 8-10, such that the operations further include: editing the image to remove the classified component features; performing image recognition on the edited image to detect additional object information; and classifying the additional object information into component features using a third classification model.

Example #12: The non-transitory computer-readable medium of example 11, such that the additional object information relates to component features that differ in at least one or size or type from the component features related to the object information.

Example #13: The non-transitory computer-readable medium of any of examples 8-12, such that the operations further include: comparing the structured wellbore schematic data to a second structured wellbore schematic data associated with a second wellbore to identify differences in component features and content features; and adjusting drilling operations associated with at least one of the wellbore or the second wellbore, based on the identified differences in component features or content features.

Example #14: A method including: obtaining an image of a physical media wellbore schematic diagram for a wellbore; identifying a layout type of the physical media wellbore schematic diagram in the image; performing text recognition and image recognition on the image to detect text information and object information based on the identified layout type; classifying the text information into content features using a first classification model; classifying the object information into component features using a second classification model; and applying engineering constraints to the content features and component features to produce structured wellbore schematic data.

Example #15: The method of example 14, further including applying a generation model to the structured wellbore schematic data to generate a digital wellbore schematic corresponding to the physical media wellbore schematic diagram.

Example #16: The method of example 15, such that applying a generation model to the structured wellbore schematic data to generate a digital wellbore schematic corresponding to the physical media wellbore schematic diagram includes: extracting component features and content features from the structured wellbore schematic data; and generating a digital wellbore schematic diagram including visual representation of the content features and component features.

Example #17: The method of any of examples 14-16, further including editing the image to remove the classified component features; performing image recognition on the edited image to detect additional object information; and classifying the additional object information into component features using a third classification model.

Example #18: The method of any of examples 14-17, such that the additional object information relates to component features that differ in at least one or size or type from the component features related to the object information.

Example #19: The method of any of examples 14-18, further including comparing the structured wellbore schematic data to a second structured wellbore schematic data associated with a second wellbore to identify differences in component features and content features; and adjusting drilling operations associated with at least one of the wellbore or the second wellbore, based on the identified differences in component features or content features.

Example #20: The method of any of examples 14-19, such that component features include at least two of casing, tubing, perforation, liner, packer, or machinery information and wherein content features include at least two of depth information, location information, assess procurement, length of time drilled, or remaining asset.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
  a processing device; and
  a non-transitory memory device comprising instructions that are executable by the processing device to cause the processing device to perform operations comprising:
    obtaining an image of a physical media wellbore schematic diagram for a wellbore;
    identifying a layout type of the physical media wellbore schematic diagram in the image;
    performing text recognition and image recognition on the image to detect text information and object information based on the identified layout type;
    classifying the text information into content features using a first classification model;
    classifying the object information into component features using a second classification model;
    editing the image to remove the classified component features;
    performing image recognition on the edited image to detect additional object information;
    classifying the additional object information into additional component features using a third classification model; and
    applying engineering constraints to the content features and component features to produce structured wellbore schematic data.

2. The computing device of claim 1, the operations further comprising:
  applying a generation model to the structured wellbore schematic data to generate a digital wellbore schematic corresponding to the physical media wellbore schematic diagram.

3. The computing device of claim 2 wherein applying a generation model to the structured wellbore schematic data to generate a digital wellbore schematic corresponding to the physical media wellbore schematic diagram comprises:
  extracting component features and content features from the structured wellbore schematic data; and
  generating a digital wellbore schematic diagram including visual representation of the content features and component features.

4. The computing device of claim 1, wherein the additional object information relates to additional component features that differ in at least one of size or type from the component features related to the object information.

5. The computing device of claim 1, the operations further comprising:
    comparing the structured wellbore schematic data to a second structured wellbore schematic data associated with a second wellbore to identify differences in component features and content features; and
    adjusting drilling operations associated with at least one of the wellbore or the second wellbore, based on the identified differences in component features or content features.

6. The computing device of claim 1, wherein component features include at least two of casing, tubing, perforation, liner, packer, or machinery information and wherein content features include at least two of depth information, location information, assess procurement, length of time drilled, or remaining asset.

7. A non-transitory computer-readable medium that includes instructions that are executable by a processing device for causing the processing device to perform operations comprising:
    obtaining an image of a physical media wellbore schematic diagram for a wellbore;
    identifying a layout type of the physical media wellbore schematic diagram in the image;
    performing text recognition and image recognition on the image to detect text information and object information based on the identified layout type;
    classifying the text information into content features using a first classification model,. wherein the content features include at least two of depth information, location information, assess procurement, length of time drilled, or remaining asset;
    classifying the object information into component features using a second classification model, wherein the component features include at least two of casing, tubing, perforation, liner, packer, or machinery information; and
    applying engineering constraints to the content features and component features to produce structured wellbore schematic data.

8. The non-transitory computer-readable medium of claim 7, wherein the operations further comprise applying a generation model to the structured wellbore schematic data to generate a digital wellbore schematic corresponding to the physical media wellbore schematic diagram.

9. The non-transitory computer-readable medium of claim 8, wherein applying a generation model to the structured wellbore schematic data to generate a digital wellbore schematic corresponding to the physical media wellbore schematic diagram comprises:
    extracting component features and content features from the structured wellbore schematic data; and
    generating a digital wellbore schematic diagram including visual representation of the content features and component features.

10. The non-transitory computer-readable medium of claim 7, wherein the operations further comprise:
    editing the image to remove the classified component features;
    performing image recognition on the edited image to detect additional object information; and
    classifying the additional object information into additional component features using a third classification model.

11. The non-transitory computer-readable medium of claim 10, wherein the additional object information relates to the additional component features that differ in at least of size or type from the component features related to the object information.

12. The non-transitory computer-readable medium of claim 7, wherein the operations further comprise:
    comparing the structured wellbore schematic data to a second structured wellbore schematic data associated with a second wellbore to identify differences in component features and content features; and
    adjusting drilling operations associated with at least one of the wellbore or the second wellbore, based on the identified differences in component features or content features.

13. A method comprising:
    obtaining an image of a physical media wellbore schematic diagram for a wellbore;
    identifying a layout type of the physical media wellbore schematic diagram in the image;
    performing text recognition and image recognition on the image to detect text information and object information based on the identified layout type;
    classifying the text information into content features using a first classification model;
    classifying the object information into component features using a second classification model; and
    applying engineering constraints to the content features and component features to produce structured wellbore schematic data;
    comparing the structured wellbore schematic data to a second structured wellbore schematic data associated with a second wellbore to identify differences in component features and content features; and
    adjusting drilling operations associated with at least one of the wellbore or the second wellbore, based on the identified differences in component features or content features.

14. The method of claim 13, further comprising:
    applying a generation model to the structured wellbore schematic data to generate a digital wellbore schematic corresponding to the physical media wellbore schematic diagram.

15. The method of claim 14 wherein applying a generation model to the structured wellbore schematic data to generate a digital wellbore schematic corresponding to the physical media wellbore schematic diagram comprises:
    extracting component features and content features from the structured wellbore schematic data; and
    generating a digital wellbore schematic diagram including visual representation of the content features and component features.

16. The method of claim 13, further comprising:
    editing the image to remove the classified component features;
    performing image recognition on the edited image to detect additional object information; and
    classifying the additional object information into additional component features using a third classification model.

17. The method of claim 16, wherein the additional object information relates to additional component features that differ in at least one of size or type from the component features related to the object information.

18. The method of claim 13, wherein component features include at least two of casing, tubing, perforation, liner, packer, or machinery information, and wherein content features include at least two of depth information, location information, assess procurement, length of time drilled, or remaining asset.

19. The method of claim 13, further comprising:
    pre-processing the physical media wellbore schematic diagram to generate a pre-processed schematic; and
    applying the first classification model to the pre-processed schematic to detect the component features.

20. The method of claim 13, wherein the engineering constraints include rules for well component placement, kick-off point (KoP) placement, asset extraction strategies, extraction exclusion zones, or depth restrictions.

\* \* \* \* \*